US010926888B2

(12) United States Patent
Martin et al.

(10) Patent No.: US 10,926,888 B2
(45) Date of Patent: Feb. 23, 2021

(54) METHODS AND SYSTEMS FOR IDENTIFYING ASSOCIATED EVENTS IN AN AIRCRAFT

(71) Applicant: The Boeing Company, Chicago, IL (US)

(72) Inventors: Charles E. Martin, Thousand Oaks, CA (US); Tsai-Ching Lu, Thousand Oaks, CA (US); Alex Waagen, Agoura Hills, CA (US); Steve C. Slaughter, Mesa, AZ (US); Alice A. Murphy, Mesa, AZ (US); Derek S. Fok, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 318 days.

(21) Appl. No.: 16/057,490

(22) Filed: Aug. 7, 2018

(65) Prior Publication Data

US 2020/0047914 A1    Feb. 13, 2020

(51) Int. Cl.
*B64D 45/00*    (2006.01)
*G07C 5/08*    (2006.01)

(52) U.S. Cl.
CPC ............. *B64D 45/00* (2013.01); *G07C 5/085* (2013.01); *G07C 5/0808* (2013.01); *G07C 5/0825* (2013.01); *B64D 2045/0085* (2013.01)

(58) Field of Classification Search
CPC ............ B64D 45/00; B64D 2045/0085; G07C 5/0808; G07C 5/0825; G07C 5/12; G07C 5/0816

(Continued)

(56) References Cited

U.S. PATENT DOCUMENTS 10,740,990 B1 *    8/2020    Craig .................... G06Q 40/08
2005/0028033 A1 *    2/2005    Kipersztok ......... G06F 11/2257
                                                              714/27

(Continued)

FOREIGN PATENT DOCUMENTS

WO    WO 2015/053774    4/2015

OTHER PUBLICATIONS

Thwaites et al, Causal Analysis with Chain Event Graphs, May 20, 2010, Elsevier, pp. 889-909 (Year: 2010).*

(Continued)

*Primary Examiner* — Krishnan Ramesh
(74) *Attorney, Agent, or Firm* — McDonnell Boehnen Hulbert & Berghoff LLP

(57) ABSTRACT

In an example, a method for identifying associated events in an aircraft is described. The method includes obtaining sensor data, obtaining fault code data, generating a set of events, where each event occurs over a time interval over which either (i) the sensor data indicates an anomalous measurement or (ii) a fault code associated with a particular aircraft subsystem of the aircraft was signaled, calculating a value of statistical dependence between the set, based on the value exceeding a threshold, constructing a network representing the set as a sequence of related events and further representing a temporal order in which the sequence occurred, indexing, in a summary table stored in memory and separate from the sensor data and the fault code data, the sequence and the value, and controlling a display device to display the summary table and a visual representation of the network.

20 Claims, 6 Drawing Sheets

(58) Field of Classification Search
USPC .......................................................... 701/31.8
See application file for complete search history.

(56) References Cited

U.S. PATENT DOCUMENTS

| | | | | |
|---|---|---|---|---|
| 2007/0011113 | A1* | 1/2007 | Mosleh | G06N 7/005 |
| | | | | 706/14 |
| 2008/0016412 | A1 | 1/2008 | White et al. | |
| 2008/0208814 | A1* | 8/2008 | Friedlander | G06N 7/005 |
| 2013/0099916 | A1 | 4/2013 | Camp et al. | |
| 2013/0159240 | A1* | 6/2013 | Singh | G07C 5/0816 |
| | | | | 706/51 |
| 2013/0274992 | A1* | 10/2013 | Cheriere | G06F 11/0739 |
| | | | | 701/32.9 |
| 2016/0239756 | A1* | 8/2016 | Aggour | H04L 41/142 |
| 2018/0365533 | A1* | 12/2018 | Sathyanarayana | G06K 9/6267 |

OTHER PUBLICATIONS

Extended European Search Report prepared by the European Patent Office in application No. EP 19 19 0166.9 dated Jan. 2, 2020.
Baptista, Marcia, et al. "Comparative case study of life usage and data-driven prognostics techniques using aircraft fault messages." Computers in Industry 86 (2017): 1-14.
Strong, E. A. (2014). Development of a Method for Incorporating Fault Codes in Prognostic Analysis.
Galar, Diego, et al. "Integration of disparate data sources to perform maintenance prognosis and optimal decision making." Insight-non-destructive testing and condition monitoring 54.8 (2012): 440-445.

* cited by examiner

US 10,926,888 B2

METHODS AND SYSTEMS FOR IDENTIFYING ASSOCIATED EVENTS IN AN AIRCRAFT

FIELD

The present disclosure relates generally to identifying associated events in an aircraft, and particularly, to how events such as anomalous sensor readings and aircraft component failure might be related.

BACKGROUND

Aircrafts are typically provisioned with equipment configured for recording data associated with the aircraft. This data can include sensor readings from various subsystems of the aircraft, such as a flight control subsystem, propulsion subsystem, or satellite communications subsystem. When a sensor reading meets certain criteria, the aircraft might responsively issue a fault messages in order to alert pilots or maintenance personnel of a potential problem, such as a failure of a particular aircraft subsystem. These fault messages can be recorded as well.

In existing aircrafts, when an event in one subsystem occurs, such as an anomalous sensor reading or a fault message, a cascading chain of other events may follow, which can propagate across various other subsystems. When this occurs, it can become difficult for maintenance personnel to identify a root cause of the problem, and in turn identify a solution to the problem.

Existing methods and systems build predictive and prognostic models that considers fault messages and other data sources as a basis for predicting when certain aircraft components might reach the end of their lifespan and need to be removed or replaced. However, these existing methods and systems can be inefficient, inaccurate, and/or ineffective for the purpose of diagnosing the cause of hardware and software problems, particularly problems that propagate across multiple subsystems as described above. As a result, extraneous efforts may be expended during diagnostic and maintenance procedures in order to resolve issues.

What is needed are systems and methods for improving the accuracy and efficiency of fault diagnostics, which can in turn improve the accuracy and efficiency of efforts taken to resolve faults and reduce the costs associated therewith.

SUMMARY

In an example, a method for identifying associated events in an aircraft is described. The method comprises obtaining sensor data that includes voltage measurements of at least one electrical bus on the aircraft over time, obtaining fault code data that includes fault codes signaled over time by a plurality of aircraft subsystems on the aircraft, where each fault code of the fault codes is associated with a respective aircraft subsystem of the plurality of aircraft subsystems that, upon detecting an error, caused the respective aircraft subsystem to output the fault code, calculating a voltage threshold that, when exceeded by the voltage measurements, indicates an anomalous voltage measurement in the sensor data, generating, from the sensor data and the fault code data, a set of events, where each event of the set of events occurs over a time interval over which either (i) the sensor data indicates the anomalous voltage measurement or (ii) a fault code associated with a particular aircraft subsystem of the plurality of aircraft subsystems was signaled, calculating a value of statistical dependence between the set of events, where the value of statistical dependence between the set of events indicates a likelihood that the set of events are a causal chain of events that occur in a temporal order, based on the value of statistical dependence between the set of events exceeding a predetermined threshold, constructing a temporal precursor network representing the set of events as a sequence of related events and further representing the temporal order in which the sequence of related events occurred, indexing, in a summary table stored in memory and separate from the sensor data and the fault code data, the sequence of related events and the value of statistical dependence between the set of events, and controlling a display device to display, on a graphical user interface, the summary table and a visual representation of the temporal precursor network.

In another example, a non-transitory computer readable medium is described. The non-transitory computer readable medium has stored thereon instructions, that when executed by one or more processors of a computing device, cause the computing device to perform operations comprising obtaining sensor data that includes voltage measurements of at least one electrical bus on the aircraft over time, obtaining fault code data that includes fault codes signaled over time by a plurality of aircraft subsystems on the aircraft, where each fault code of the fault codes is associated with a respective aircraft subsystem of the plurality of aircraft subsystems that, upon detecting an error, caused the respective aircraft subsystem to output the fault code, calculating a voltage threshold that, when exceeded by the voltage measurements, indicates an anomalous voltage measurement in the sensor data, generating, from the sensor data and the fault code data, a set of events, where each event of the set of events occurs over a time interval over which either (i) the sensor data indicates the anomalous voltage measurement or (ii) a fault code associated with a particular aircraft subsystem of the plurality of aircraft subsystems was signaled, calculating a value of statistical dependence between the set of events, where the value of statistical dependence between the set of events indicates a likelihood that the set of events are a causal chain of events that occur in a temporal order, based on the value of statistical dependence between the set of events exceeding a predetermined threshold, constructing a temporal precursor network representing the set of events as a sequence of related events and further representing the temporal order in which the sequence of related events occurred, indexing, in a summary table stored in memory and separate from the sensor data and the fault code data, the sequence of related events and the value of statistical dependence between the set of events, and controlling a display device to display, on a graphical user interface, the summary table and a visual representation of the temporal precursor network.

In another example, a system is described. The system comprises a plurality of aircraft subsystems on an aircraft. The system further comprises a fault diagnostics computing device having a processor and memory storing instructions executable by the processor to perform operations comprising obtaining sensor data that includes voltage measurements of at least one electrical bus on the aircraft over time, obtaining fault code data that includes fault codes signaled over time by the plurality of aircraft subsystems, where each fault code of the fault codes is associated with a respective aircraft subsystem of the plurality of aircraft subsystems that, upon detecting an error, caused the respective aircraft subsystem to output the fault code, calculating a voltage threshold that, when exceeded by the voltage measurements, indicates an anomalous voltage measurement in the sensor data, generating, from the sensor data and the fault code data, a set of events, where each event of the set of events occurs over a time interval over which either (i) the sensor data indicates the anomalous voltage measurement or (ii) a fault code associated with a particular aircraft subsystem of the plurality of aircraft subsystems was signaled, calculating a value of statistical dependence between the set of events, where the value of statistical dependence between the set of events indicates a likelihood that the set of events are a causal chain of events that occur in a temporal order, based on the value of statistical dependence between the set of events exceeding a predetermined threshold, constructing a temporal precursor network representing the set of events as a sequence of related events and further representing the temporal order in which the sequence of related events occurred, indexing, in a summary table stored in the memory and separate from the sensor data and the fault code data, the sequence of related events and the value of statistical dependence between the set of events, and controlling a display device to display, on a graphical user interface, the summary table and a visual representation of the temporal precursor network.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
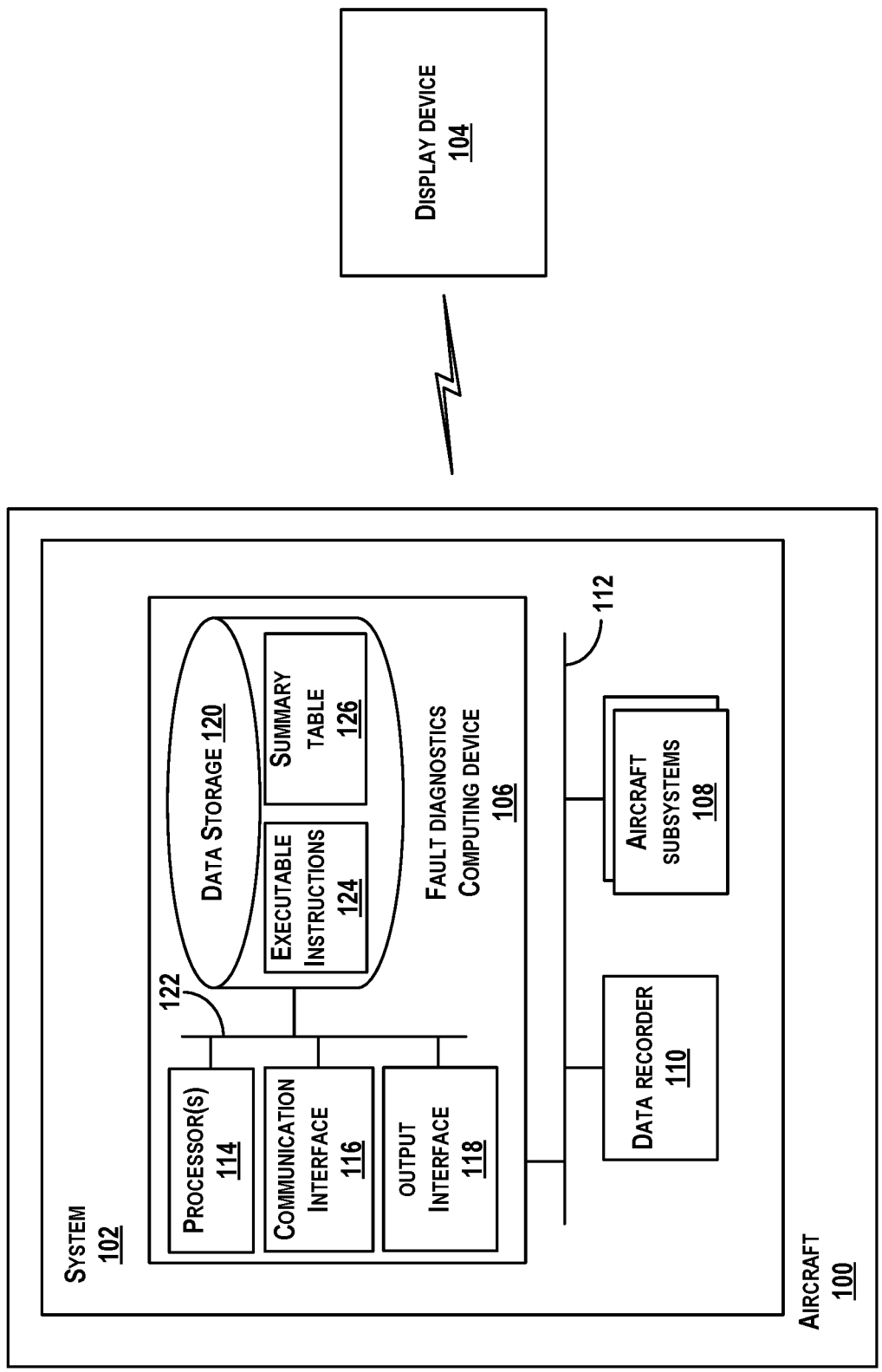
FIG. 1 illustrates a block diagram of an example aircraft, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, methods and systems for identifying associated events in are described. More specifically, example methods and systems involve determining statistically meaningful associations between events that occur across multiple different aircraft components, such as electrical buses and aircraft subsystems.

In this disclosure, an aircraft subsystem for which sensor readings can be acquired and an electrical bus that carries those sensor readings can be considered to be separate components of the aircraft because in some scenarios it might not be readily apparent which aircraft subsystem a given sensor reading detected on the electrical bus is associated with, as a given electrical bus can carry sensor readings from multiple different subsystems.

A data recorder on the aircraft is configured to record data over time, such as data recorded during flights of the aircraft. Data that is recorded can include sensor data and fault code data, among other things. The sensor data can take the form of voltage measurements or other measurements determined by sensors on the aircraft. Once acquired by the sensors, the sensor data can be transmitted on one or more electrical buses of the aircraft to other systems on the aircraft, such as the data recorder. The fault code data, on the other hand, includes fault codes that have been signaled over time by various aircraft subsystems on the aircraft, such as a flight control subsystem, displays subsystem, environmental control subsystem, propulsion control subsystem, communications subsystem, integrated pressurized air subsystem, and/ or Integrated Helmet and Display Sight System (IHADSS) subsystem, among other possibilities. In particular, when an aircraft subsystem detects an error, the aircraft subsystem outputs a signal that identifies a particular fault code. Within examples, the fault code can take the form of a string of numbers and/or letters (e.g., "3456"). Additionally or alternatively, the signal can include data representing a textual description of the fault code, such as "Bleed Air Pressure Fault" or "Flight Management Multiplexer Failure."

The methods and systems described herein may involve using recorded data from multiple sources (i.e., sensor data and fault code data) to generate events that occur in the aircraft and to identify associations between the events. An "event" refers collectively to a time interval over which either (i) a sensor reading from the sensor data meets criteria that indicates an anomaly (e.g., a threshold-high positive or negative spike in voltage) or (ii) a fault code was signaled.

In this disclosure, anomalous sensor readings will be described primarily in the context of anomalous voltage measurements, although in other implementations, other measurements can be used as a basis for identifying an event. For example, when the sensor data indicates a measurement of current or power that exceeds a particular threshold, the measurement may be considered anomalous.

The methods and systems described herein may involve detecting that certain event criteria have been met (e.g., an anomalous sensor reading and/or signaled fault code) and generating a set of events that have occurred with respect to the aircraft. In line with the discussion above, the occurrence of one or more events can trigger a causal chain of events across multiple components on the aircraft. For example, an error with a multiplexer in a signal processing subsystem might cause an error with a flight control subsystem, which might in turn cause an error with a multiplexer in a flight management subsystem. The data record can record fault codes that indicates each error, but it might be difficult to discern which error caused the others, or even to determine whether the errors are related at all. This issue can be compounded when numerous (e.g., tens or hundreds) errors occur over the course of a single flight of the aircraft, over multiple different flights of the aircraft, and/or over flights of other aircrafts.

Thus, the methods and systems described herein may also involve calculating a value of statistical dependence between a set of events. The value indicates a likelihood that the set of events are a causal chain, or "sequence," of events that occur in a temporal order. In other words, the value indicates whether the set of events occur because of random coincidence or due to an underlying dependency. Associated (e.g., statistically-dependent) pairings or larger groups of events are used to construct a temporal precursor network, which represents the sequence in which related events occur as well as the temporal order in which they occur. In addition, associated pairings or larger groups of events, as well as values representing their statistical dependencies, are indexed in a summary table stored in memory, separate from the sensor data, fault code data, and other data recorded by the data recorder. Both the summary table and the temporal precursor network are then displayed on a graphical user interface. The methods and systems thus efficiently provide accurate indications of associations (or lack thereof) between events, which serve as actionable insight into problems on the aircraft.

In the manner discussed above, the methods and systems can facilitate dynamically taking recorded sensor data and fault code data and identifying, from that data, important events that have occurred with respect to the aircraft, thus reducing the amount of data considered in diagnosing and resolving aircraft problems. In addition, the methods and systems described herein can facilitate calculating statistical dependencies between events (thus narrowing down potential causes of sequences of related events) and indexing sequences of related events, as well as indications of their statistical dependencies, in a summary table separate from where the sensor data and fault code data is stored. Further, the methods and systems described herein can facilitate displaying sequences of related events in a simplified, yet useful manner in the form of the temporal precursor network. The temporal precursor network and summary table enable quick lookups and efficient storage/display of valuable information that can be used to efficiently diagnose and resolve aircraft problems resulting from sequences of events. The temporal precursor network and summary table can be dynamically updated as additional recorded data is analyzed and additional sequences of events are identified.

Example methods and systems can involve indexing other useful information and making other useful calculations to provide additional accuracy and efficiency in identifying associations between events. In one example, methods and systems can calculate and index data that indicate uniformity of the occurrence of related events, such as data that indicates whether a sequence of related events is exhibited across many different flights of the aircraft and/or across other aircrafts, as opposed to the sequence of related events being a more isolated occurrence. Other examples are possible as well.

Implementations of this disclosure provide technological improvements that are particular to computer networks and computing systems, for example, computing systems on an aircraft that are integrated to facilitate safe and efficient operation of the aircraft.

Computing system-specific technological problems, such as the management and use of large quantities of complex data stemming from multiple sources, as well as inefficiency associated therewith, can be wholly or partially solved by the implementations of this disclosure. For example, implementation of this disclosure reduces time spent analyzing data to narrow down causes of problems with aircraft subsystems, which in turn can reduce time spent resolving such problems. Thus, implementation of this disclosure can reduce the cost and complexity of implementing less efficient methods and systems for diagnosing and resolving such problems. As another example, implementation of this disclosure increases accuracy and reliability of diagnostic information.

Implementations of this disclosure can thus introduce new and efficient improvements in the ways in which a fault diagnostics system or other system on an aircraft identifies, stores, and presents associated events on the aircraft, and in turn facilitate new and efficient improvements in the ways in which the associated events are used to diagnose and resolve problems. Implementations of this disclosure can condense and perform calculations with large amounts of information that might not normally indicate errors with components of the aircraft, in order to make the information interpretable for the purpose of identifying causal relationships of faults and other anomalies on the aircraft.

Referring now to the figures, FIG. 1 illustrates a block diagram of an example aircraft 100, according to an example implementation. The aircraft 100 includes a system 102. Within examples, the system 102 can be configured for communicating with a display device 104, and thus the system 102 is shown to be in communication with the display device 104.

The display device 104 can take the form of a computing device having a touch screen, computer monitor, or other component capable of providing visual information such as a graphical user interface. The computing device can be a laptop computer, tablet computer, desktop computer, smartphone, or other type of computer with which the system 102 has a communication interface. Through this interface, the system 102 (or a component thereof) can transmit, to the display device 104, instructions that, upon receipt by the display device 104, cause the display device 104 to display information specified by the instructions. For example, the system 102 can control the display device 104 to provide for display, on graphical user interface, the summary table and/or temporal precursor network described in this disclosure by providing an instruction to the display device 104 that includes data representing the summary table and/or the temporal precursor network. The display device 104 can also include other devices configured to receive input from a user (e.g., a maintenance worker for the aircraft 100 or a pilot of the aircraft 100) and/or provide output to the user, such as a keyboard, mouse, etc.

In FIG. 1, the display device 104 is shown as separate from the aircraft 100. Additionally or alternatively, in some implementations, the display device 104 can be a display device located on the aircraft 100, such as a computing device located in the cockpit of the aircraft 100.

Further, the system 102 is shown to include a fault diagnostics computing device 106. The fault diagnostics computing device 106 is configured with program logic that enables the fault diagnostics computing device 106 to use recorded data to perform functions described in this disclosure, such as functions related to identifying events that occur in the aircraft 100 and to identify associations between the events. Other types of computing devices could be similarly configured and used in addition to or alternative to the fault diagnostics computing device 106 to perform one or more functions. Such computing devices could be on-board the aircraft 100 or located remotely from, but in communication with, the aircraft 100.

The system 102 is also shown to include a plurality of aircraft subsystems 108 and a data recorder 110, each of which are shown to be communicatively coupled to the fault diagnostics computing device 106 by way of a communication bus 112. The fault diagnostics computing device 106 can thus receive and transmit communications to the data recorder 110 and/or the aircraft subsystems 108 over the communication bus 112.

As discussed above, the aircraft subsystems 108 can include a variety of subsystems, each of which can be configured to perform certain functions, such as monitoring altitude, speed, temperature (e.g., inside and outside the aircraft 100), air pressure, fuel level, and orientation, monitoring whether various computing devices, sensors, or components thereof are operating as desired, and/or controlling physical components of the aircraft 100, such as the rudder and ailerons, among other possibilities. Example aircraft subsystems include a flight control subsystem, a displays subsystem, and an environmental control subsystem, among other possibilities. Example aircraft subsystems may themselves respectively include sensors, computing devices, and/or other hardware as needed to perform functions of the subsystem.

The data recorder 110 can take the form of a computing device having one or more processors, memory, a communication interface for receiving/transmitting communications to/from other components of the aircraft 100. The memory of the data recorder 110 can include one or more databases in which the data recorder 110 stores recorded data. The data recorder 110 can store multiple types of data in the same database, or can store multiple different types of data, each in a respective database dedicated for storing that type of data.

As discussed above, the data recorder 110 is configured to acquire and store data from a variety of sources, such as various sensors located throughout the aircraft 100 or one or more other computing devices on the aircraft 100. The data that the data recorder 110 records can include sensor data and fault code data, among other possibilities. In this disclosure, "sensor data" can include a variety of types of measurements, such as voltage, current, or power, acquired by sensors throughout the aircraft 100. Within examples, such measurements can be directly associated with a particular sensor or aircraft subsystem and might include information identifying the particular sensor or the aircraft subsystem with which the measurements are associated. Within other examples, it might be more difficult to ascertain the cause of the measurements, such as when a measurement is acquired from a sensor located along an electrical bus on the aircraft 100. For instance, an electrical bus might carry signals related to a condensing unit of the aircraft 100, a pneumatic system of the aircraft 100, and a compressor of a jet engine of the aircraft 100. When a sensor located at a certain location along the electrical bus measures a spike in voltage at that location, the spike might be attributed to one or more of the condensing unit, pneumatic system, or compressor, but the measurement itself, being a voltage measurement, would not indicate as such. There can be multiple electrical buses in the aircraft 100, and at least one sensor configured for acquiring measurements on each such electrical bus. There are scenarios in which sensor readings from electrical buses on the aircraft 100 can be different from expected readings, but the source of this difference may be unknown and not indicated by the sensor data.

Fault code data, as noted above, includes fault codes that have been signaled over time by the aircraft subsystems 108. Each fault code is associated with a respective aircraft subsystem of the aircraft subsystems 108. When that respective aircraft subsystem (or, more particularly, a sensor associated with the respective aircraft subsystem) detects an error, the respective aircraft subsystem outputs the fault code signal. Within examples, an error is a sensor reading that falls outside a predefined range, although errors can take other forms. Particular errors correspond to particular fault codes. Some aircraft subsystems can have multiple components that can fail or multiple ways in which an error can occur. Thus, multiple fault codes could be associated to a single aircraft subsystem.

The data recorder 110 can receive signaled fault codes directly from various aircraft subsystems 108 or can receive the signaled fault codes from an intermediary device. For example, the aircraft 100 can include an intermediary device that, upon detecting a sensor reading that falls out of a predefined range, triggers the intermediary device to signal, over communication bus 112, to the data recorder 110, a corresponding fault code, and so long as the sensor reading is out of the predefined range, the fault code will be signaled.

When the data recorder 110 receives a fault code, the data recorder 110 can then store fault code data corresponding to the fault code, such as a start time when the fault code was first signaled and an end time when the fault code stopped being signaled.

Each fault code of the fault codes is associated with a respective aircraft subsystem of the plurality of aircraft subsystems that, upon detecting an error, caused the respective aircraft subsystem to output the fault code;

The data recorder 110 can record other data as well. For example, when a fault code is signaled, the data recorder 110 can store data indicating a "tail number"—namely, an identifier of the aircraft 100—with which the fault code is associated. The identifier of the aircraft 100 can uniquely identify the aircraft 100 with respect to other aircraft.

The data recorder 110 can be configured to record data during flight of the aircraft 100 and/or when the aircraft 100 is not in flight (e.g., in a hangar). For example, when auxiliary electrical power to the aircraft 100 has been turned on, this can trigger the data recorder 110 to begin recording data, and when auxiliary electrical power to the aircraft 100 turns off, this can trigger the data recorder 110 to stop recording data. For brevity, the time period that elapses between the auxiliary electrical power being turned on and being turned off is referred to in this disclosure as a "flight" of the aircraft 100, even if the aircraft 100 might not be in the air during the entirety of that time period. However, it should be understood that other examples of start times and end times that delineate a flight are possible as well. In some implementations, the data recorder 110 can be configured to store recorded data from one flight as one file (e.g., a delimited text file) and store recorded data from another flight in another, separate file.

In some implementations, the fault diagnostics computing device 106 can be configured to perform some or all of the functions performed by the data recorder 110. To facilitate this, for example, the data recorder 110 could be a component of the fault diagnostics computing device 106, as opposed to being separate components as shown in FIG. 1.

Referring back to FIG. 1, the fault diagnostics computing device 106 is shown to include one or more processors 114, a communication interface 116, an output interface 118, and data storage 120, each connected to a communication bus 122. The fault diagnostics computing device 106 may also include hardware to enable communication within the fault diagnostics computing device 106 and between the fault diagnostics computing device 106 and other devices (not shown). The hardware may include transmitters, receivers, and antennas, for example.

The communication interface 116 may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 116 may be configured to receive input data from one or more devices, and may also be configured to send output data to other devices.

The output interface 118 outputs information, such as outputting information from the fault diagnostics computing device 106 to the data recorder 110. For example, the output interface 118 can output a request for the data recorder 110 to provide the fault diagnostics computing device 106 with sensor data or fault code data. The output interface 118 may thus be similar to the communication interface 116 and can be a wireless interface (e.g., transmitter) or a wired interface as well.

The data storage 120 may include or take the form of memory, such as one or more computer-readable storage media that can be read or accessed by the processor(s) 114. The computer-readable storage media can include volatile and/or non-volatile storage components, such as optical, magnetic, organic or other memory or disc storage, which can be integrated in whole or in part with the one or more processors 114. The data storage 120 is considered non-transitory computer readable media. In some examples, the data storage 120 can be implemented using a single physical device (e.g., one optical, magnetic, organic or other memory or disc storage unit), while in other examples, the data storage 120 can be implemented using two or more physical devices.

The data storage 120 thus is a non-transitory computer readable storage medium, and executable instructions 124 are stored thereon. The executable instructions 124 include computer executable code. In addition, the data storage 120 also stores the summary table 126 in which sequences of related events and values of statistical dependence can be placed. The data storage 120 also stores the temporal precursor network. The data storage 120 can also store events, such as the sets of events (regardless of whether or not the sets of events are determined to be sequences of related events) and can store copies of sensor data and/or fault code data recorded by the data recorder 110. Other data can be stored in the data storage 120 as well, examples of which will be described in more detail below.

The processor(s) 114 may be general-purpose processors or special purpose processors (e.g., digital signal processors, application specific integrated circuits, etc.). The processor(s) 114 can be configured to execute the executable instructions 124 (e.g., computer-readable program instructions) that are stored in the data storage 120 and are executable to provide the functionality of the fault diagnostics computing device 106 described herein. For example, the executable instructions 124 can define a software application that, when executed, causes the fault diagnostics computing device 106 to perform one or more of the functions described herein.

Within one example, in operation, when the executable instructions 124 are executed by the processor(s) 114 of the fault diagnostics computing device 106, the processor(s) 114 are caused to perform functions including obtaining sensor data that includes voltage measurements of at least one electrical bus on an aircraft over time, obtaining fault code data that includes fault codes signaled over time by a plurality of aircraft subsystems on the aircraft, where each fault code of the fault codes is associated with a respective aircraft subsystem of the plurality of aircraft subsystems that, upon detecting an error, caused the respective aircraft subsystem to output the fault code, calculating a voltage threshold that, when exceeded by the voltage measurements, indicates an anomalous voltage measurement in the sensor data, generating, from the sensor data and the fault code data, a set of events, where each event of the set of events occurs over a time interval over which either (i) the sensor data indicates the anomalous voltage measurement or (ii) a fault code associated with a particular aircraft subsystem of the plurality of aircraft subsystems was signaled, calculating a value of statistical dependence between the set of events, wherein the value of statistical dependence between the set of events indicates a likelihood that the set of events are a causal chain of events that occur in a temporal order, based on the value of statistical dependence between the set of events exceeding a predetermined threshold, constructing a temporal precursor network representing the set of events as a sequence of related events and further representing the temporal order in which the sequence of related events occurred, indexing, in a summary table stored in memory and separate from the sensor data and the fault code data, the sequence of related events and the value of statistical dependence between the set of events, and controlling a display device to display, on a graphical user interface, the summary table and a visual representation of the temporal precursor network.

More detailed example operations will now be described. While some operations are described as being performed in a particular order, it should be understood that such operations could be performed in different orders.

Within examples described herein, the fault diagnostics computing device 106 can obtain sensor data and fault code data that has been acquired over time. At this stage, or some time before obtaining the sensor data and fault code data, a user can select and input to the fault diagnostics computing device 106 a time threshold that can be used for constructing the temporal precursor network and calculating values of statistical dependence between sets of events. The time threshold represents a maximum amount of time that elapses between two identified events where the two events can still be reasonably thought to be associated. A large time threshold (e.g., one hour or more) can increase the complexity of the temporal precursor network by producing more sequences of events, some of which might not accurately represent events that were causally related. Thus, a time threshold that is not too large, such as less than an hour or as low as one second or ten minutes, is desirable. In some implementations, the time threshold can be determined based on rates at which fault codes and/or voltage measurements are recorded/sampled, or based on other factors.

There may be large amounts of sensor data and/or fault code data that is recorded by the data recorder 110, and not all of it may be helpful for the purposes of identifying associated events in the aircraft 100. Additionally or alternatively, it may be less computationally efficient to identify associated events using excessive or otherwise undesirable amounts of data. For at least these reasons, in some implementations, at some point before the fault diagnostics computing device 106 generates a set of events from the sensor data and the fault code data, such as after the fault diagnostics computing device 106 obtains the sensor data and the fault code data, the fault diagnostics computing device 106 can filter the obtained sensor data and fault code data.

Within examples, the fault diagnostics computing device 106 can remove portions of sensor data and/or fault code data that was obtained during a predefined period of time or obtained during a portion of a flight procedure (e.g., pre-flight, during flight, take-off, landing). For instance, when an aircraft is engaged in pre-flight start procedures, such procedures might trigger spurious fault codes and/or voltage spikes to occur, and thus the predefined period of time can be a period of time during which the aircraft is expected to be engaged in pre-flight start procedures. Within other examples, the fault diagnostics computing device 106 can remove portions of sensor data and/or fault code data that are of a predefined size. For example, the fault code data can take the form of a table where each row corresponds to the same interval of time (e.g., 0.16 seconds) and includes a value indicating whether a fault code was active (e.g., a value of 1) or inactive (e.g., a value of 0) during that interval of time. As such, the fault diagnostics computing device 106 can remove a predefined quantity of rows from the table, such as a predefined quantity of rows (e.g., one hundred rows) that is expected to correspond to a period of time during which the aircraft is engaged in pre-flight start procedures or another period of time. Sensor data can be represented in similarly arranged tables as well, such as a table in which a value in a given row is an average voltage measurement present during the interval of time defined by the row.

Table 1 below illustrates an example fault code data table (where, for Status, 1=active and 0=inactive), and Table 2 below illustrates an example sensor data table (where the values in the right column are in volts (V)).

TABLE 1

| Fault Code | Status |
|---|---|
| 3564 | 1 |
| 3564 | 1 |
| 3564 | 0 |
| 765 | 1 |
| 765 | 0 |

TABLE 2

| Sensor | Sensor Value (V) |
|---|---|
| Electrical Bus 2 | 3 |
| Electrical Bus 2 | 2 |
| Electrical Bus 2 | 7 |
| Electrical Bus 2 | 7 |
| Electrical Bus 2 | 3 |

Further, within other examples, data recorded during some portions of the aircraft's flight can be more helpful or otherwise more desirable than others in some scenarios. As such, in some implementations, the fault diagnostics computing device 106 can remove, from the sensor data, voltage measurements that were obtained during periods of time during which a rotational speed of a rotor of the aircraft exceeded a threshold number of revolutions per minute. Additionally or alternatively, the fault diagnostics computing device 106 can remove from the fault code data, fault codes that were signaled during periods of time during which the rotational speed of the rotor of the aircraft exceeded the threshold number of revolutions per minute. For instance, the threshold number of revolutions per minute can be a value selected from the range of 50 to 110 revolutions per minute. Other example filtering criteria and associated thresholds are possible as well, which can be considered additionally or alternatively to rotational speed of a rotor of the aircraft 100. For example, one such criteria can relate to a landing gear of the aircraft 100. For example, there may be a value associated with a position of the landing gear, where the value is zero when the landing gear is not down. As such, the fault diagnostics computing device 106 can remove portions of data that were obtained/signaled when the landing gear value was zero. Other examples are possible as well. In some scenarios, it can be useful to select thresholds that are related to flight of the aircraft 100, as it may be desirable to remove any data for when the aircraft 100 is not in flight, though in other scenarios, data not obtained during flight could be considered as well.

After obtaining the sensor data, the fault diagnostics computing device 106 can calculate a voltage threshold that, when exceeded by the voltage measurements, indicates an anomalous voltage measurement in the sensor data. Within examples, to calculate the voltage threshold, the fault diagnostics computing device 106 can calculate a mean and standard deviation for the voltage measurements acquired over time with respect to the aircraft 100. In particular, the mean and standard deviation may be calculated using voltage measurements from a selected period of time, such as over the past day, week, or perhaps since the aircraft's first flight. The voltage threshold can be a number of standard deviations away from the mean, where voltage measurements that fall outside that number can be considered anomalous. For instance, if a voltage measurement is more than one standard deviation away from the mean, it is considered anomalous. Other examples are possible as well.

In other examples, the voltage threshold can be an actual voltage value (e.g., 5 volts) rather than a number of standard deviations.

Along these lines, the fault diagnostics computing device 106 can use the mean and standard deviation as a way to encode the sensor data so that the fault diagnostics computing device 106 can more easily identify events from the sensor data. For example, for each value, P(i), that the voltage measurements take in a predefined interval (e.g., for each value in each row of the table), the fault diagnostics computing device 106 can calculate an encoded sensor value, φ(P(i)), according to Equation 1 below, where $\mu_T$ is the mean for the aircraft 100 (i.e., the tail number of the aircraft 100) and $\mu_T$ is the standard deviation for the aircraft 100.

$$\varphi(P(i)) = \text{int}((P(i) - \mu_T)/\sigma_T) \quad \text{(Equation 1)}$$

Using Equation 1, the mean is subtracted from the value in the interval and the result is divided by the standard deviation to find how many positive or negative deviations the value is from the mean. Any resulting decimal is removed to transform the number of deviations to an integer value. Using Equation 1 on Table 2, for instance, would result in Table 3. The encoded sensor value in Table 3 is not in volts.

TABLE 3

| Sensor | Encoded Sensor Value |
| --- | --- |
| Electrical Bus 2 | 0 |
| Electrical Bus 2 | 0 |
| Electrical Bus 2 | 1 |
| Electrical Bus 2 | 1 |
| Electrical Bus 2 | 0 |

The encoded sensor values can then be compared to a voltage threshold. For instance, when the voltage threshold is zero, the encoded sensor value must be one or greater to be considered anomalous. In some implementations, the fault diagnostics computing device 106 might not calculate a voltage threshold, but would rather be configured with one.

The fault diagnostics computing device 106 then generates a set of events from the sensor data and the fault code data. As noted above, each event of a set of events is an event that occurs over a time interval over which either (i) the sensor data indicates the anomalous voltage measurement or (ii) a fault code associated with a particular aircraft subsystem of the plurality of aircraft subsystems was signaled. For example, with respect to Table 3, the fault diagnostics computing device 106 can generate an event for the time interval over which the encoded sensor value is 1. And with respect to Table 1, for example, the fault diagnostics computing device 106 can generate an event for any time interval over which a given fault code was active.

For each event that is generated, the fault diagnostics computing device 106 can label the event with a start time and an end time, such as a start time and end time with respect to when the flight began, or with respect to a different reference point in time. Further, each event generated by the fault diagnostics computing device 106 can take the form of a value and associated time interval over which the value occurred. For an event involving an anomalous voltage measurement, the value can take the form of the encoded sensor value during that time interval, as described above. For an event involving a fault code, the value can take the form of the fault code that was signaled over the time interval.

Further, the fault diagnostics computing device 106 can store in the data storage 120, or access from remote data storage, reference data that correlates fault codes to respective aircraft subsystems on the aircraft 100, and can refer to the reference data to determine, for each event involving a fault code, the aircraft subsystem with which the fault code is associated and label the event with the appropriate aircraft subsystem. This can help with the construction and display of the temporal precursor network and the summary table 126, as either or both can include a label for each event so that a user can see the aircraft subsystem with which the event is associated.

The fault diagnostics computing device 106 then calculates a value of statistical dependence between the set of events. The value of statistical dependence (which is a form of "mutual information," as referred to in information theory) indicates a likelihood that the set of events are a causal chain of events that occur in a temporal order. In other words, the value of statistical dependence indicates a strength of association between events. Values of statistical dependence can be used to construct the temporal precursor network and show causal relationships between events, such as which fault code preceded and potentially caused another fault code and/or which fault code preceded and potentially caused an anomalous voltage measurement. This can thus indicate which aircraft subsystems might be interacting or otherwise affecting each other.

Within examples, a value of statistical dependence between k events, $M(A_1, A_2, \ldots, A_k)$, can be represented by Equation 2, where $A_1, A_2, \ldots, A_k$ are each distinct events, m is the total number of events that have occurred with respect to the aircraft 100 over all flights of the aircraft 100, $N(A_1, A_2, \ldots, A_k)$ is the total number of times in which event $A_1$ has a start time which precedes the start time of event $A_2$ by more than a predetermined threshold period of time (e.g., the time threshold discussed above) and event $A_2$ has a start time which precedes the start time of the following event, and so on (until event $A_k$), $N(A_1)$ is the total number of times event $A_1$ has occurred, $N(A_2)$ is the total number of times event $A_2$ has occurred, and so on.

$$M(A_1, A_2, \ldots, A_k) = m^{k-1} \frac{N(A_1, A_2, \ldots, A_k)}{N(A_1)N(A_2) \ldots N(A_k)} \quad \text{(Equation 2)}$$

For example, if a value of statistical dependence is calculated between a pair of events—namely, a first event and a second event, where k equals 2—Equation 3 can be used, where the first event is represented as A, and B is used (instead of $A_2$) to represent the second event.

$$M(A, B) = m \frac{N(A, B)}{N(A)N(B)} \quad \text{(Equation 3)}$$

The fault diagnostics computing device 106 then compares value of statistical dependence for a set of events to a predetermined threshold and that comparison indicates the likelihood that the set of events are a causal chain of events that occur in a temporal order. For example, M(A,B) being less than a threshold of 1 might indicate that event A is not very likely to precede event B and that the two events are not likely to be associated. Thus, this might indicate that the two events occurring within a predetermined period of time of one another is random chance rather than a statistical significance. On the other hand, M(A,B) being greater than 1 might indicate that the two events have a stronger likelihood of being associated, although, depending on the value, the association might not be strong. For example, a value between 1 and 10 might be a weaker association, whereas a value higher than 10 (or much higher, such as 10,000) might indicate a stronger association.

The fault diagnostics computing device 106 then uses a comparison of the value of statistical dependence to the predetermined threshold (e.g., 1) as a basis for constructing the temporal precursor network. When the fault diagnostics computing device 106 determines that the value of statistical dependence between the set of events is less than the predetermined threshold, the set of events might not be added to the temporal precursor network. On the other hand, when the fault diagnostics computing device 106 determines that the value of statistical dependence between the set of events exceeds the predetermined threshold, the set of events is added to the temporal precursor network and represented as a sequence of related events that occurred in a temporal order. Because the value of statistical dependence relates to a likelihood that events are related, the temporal order represented by the temporal precursor network might not be a confirmed temporal order, but rather a temporal order that is likely enough to have occurred, and thus important enough to be used for diagnosing a cause of associated events. A user such as maintenance personnel or an operator of the aircraft 100 can have more confidence that the information in the temporal precursor network indicates causal chains of events rather than random, non-causal chains of unrelated events.

Within examples, a set of events can be added to the temporal precursor network as a sequence of related events in the form of connected nodes. For example, each event of the sequence of related events can be represented as a separate node and can be connected by links that indicate the temporal order in which the sequence of related events occurred. The temporal precursor network can be used as a visualization tool to indicate which aircraft subsystems interact with each other. Additionally, in some scenarios, the temporal precursor network could be used to assist with fault diagnostics.

Figure 2:
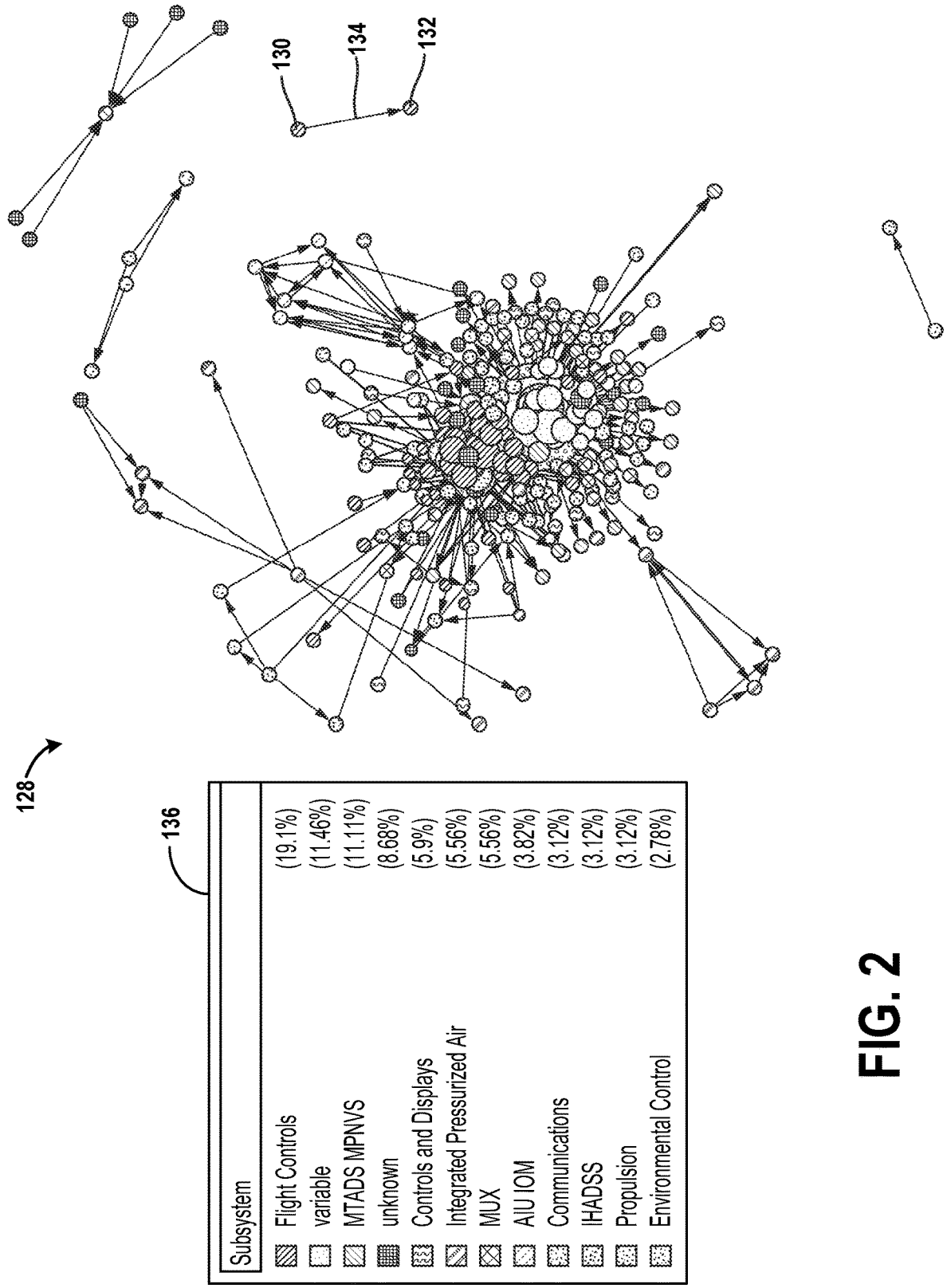
FIG. 2 illustrates an example temporal precursor network, according to an example implementation.

FIG. 2 illustrates an example temporal precursor network 128, according to an example implementation. The temporal precursor network 128 shown in FIG. 2 includes only pairs of related events, although in other implementations, a temporal precursor network can indicate sequences of two or more related events. An example set of events that is represented as a sequence of related events includes nodes 130 and 132, which are connected by an arrow 134 that shows that the event represented by node 130 is statistically likely to have caused the event represented by node 132. Within examples, the thickness, color, or other characteristic of the arrow that is displayed can change depending on the value of statistical dependence for a given set of events. For instance, an arrow can be thicker when the value of statistical dependence is higher, or thinner when the value of statistical dependence is lower.

In some implementations, the value of statistical dependence between two or more events can be included in the temporal precursor network 128. Also shown in the temporal precursor network 128 is a subsystem table 136, which can be included as part of a temporal precursor network in some implementations. The subsystem table 136 can include a list of aircraft subsystems and/or electrical buses and, for each aircraft subsystem or electrical bus, an indication (e.g., a percentage, as shown) of how many events on the aircraft 100 are associated with that aircraft subsystem or electrical bus. The temporal precursor network 128 can include other information as well.

At some point before, during, or after constructing the temporal precursor network, the fault diagnostics computing device 106 indexes, in the summary table 126 and separate from databases and/or tables which store the sensor data and the fault code data, both the sequence of related events and the value of statistical dependence between the set of events. The fault diagnostics computing device 106 then controls the display device 104 to display, on a graphical user interface, the summary table 126 and a visual representation of the temporal precursor network 128, such as the visual representation shown in FIG. 2.

Both the temporal precursor network 128 and the summary table 126 provide maintenance personnel, an operator of the aircraft 100, or other users with different manners in which to view and confidently assess potential causal chains of events. The temporal precursor network 128, for instance, visually depicts events that are statistically likely to have led to other events, as well as visually depicts which aircraft subsystems are experiencing more events than others. Using the temporal precursor network 128, a user can trace events between multiple different aircraft subsystems and/or electrical buses. As an example, seconds after a flight control subsystem fault code is signaled, fault codes in two other subsystems might be signaled. However, only one of those two subsequent fault codes might be statistically dependent on the flight control subsystem fault code, and the temporal precursor network 128 can depict that causal chain, thereby enabling a user to confidently eliminate the possibility that the other of the two subsequent fault codes is being caused by the flight control subsystem fault code. Other examples are possible as well.

Furthermore, the summary table 126 provides a concise summary of events having threshold-high statistical dependence. Using the summary table 126, a user can view and navigate through the summary table 126 to quickly search for and identify chains of events that are of interest, as well as confidently eliminate chains of events that, while shown to be statistically dependent, might not actually be casually related. The ability for a user to discern which chains of events are, in actuality, causal chains with a root cause can be even further assisted by the fault diagnostics computing device 106 indexing additional measurements in the summary table 126, examples of which will be discussed in more detail below.

The act of indexing can involve organizing the sequence of related events and the value of statistical dependence into rows and columns of the summary table 126. Further, once the summary table 126 is created, the fault diagnostics computing device 106 can maintain the summary table 126 in the data storage 120 and the act of indexing can involve updating the summary table 126 to add respective rows with newly-identified sequences of events and corresponding values of statistical dependence. In some scenarios, the sequence of events can occur multiple times, but can change in various ways. For example, in one scenario, event A might occur and event B might follow five seconds later, whereas at a later time (e.g., during the next flight of the aircraft 100) event B might follow event A by thirty seconds, which can affect the value of statistical dependence between the two events. In this situation, the act of indexing can involve updating the value of statistical dependence of an existing sequence of events in the summary table 126. Other examples are possible as well.

The sequence of related events can be represented in the summary table 126 using identifiers. For example, if the event is a sensor measurement anomaly, the fault diagnostics computing device 106 can include in the summary table 126 an identifier of the electrical bus and/or the sensor that acquired the anomalous measurement. If the fault diagnostics computing device 106 has stored in the data storage 120 one or more aircraft subsystems that feed into the electrical bus at issue, the fault diagnostics computing device 106 can include identifier(s) of the one or more aircraft subsystems as well. Further, in some implementations, the fault diagnostics computing device 106 can include in the summary table 126 how many standard deviations below or above the mean the voltage measurement was.

As another example, if the event is a fault code that was signaled, the fault diagnostics computing device 106 can include in the summary table 126 an identifier of the fault code and/or an identifier of the aircraft subsystem with which the fault code is associated. As noted above, the fault diagnostics computing device 106 can refer to reference data to determine to which aircraft subsystem the fault code corresponds.

In some implementations, the fault diagnostics computing device 106 can rank-order sequences of related events based on one or more factors, such as the values of statistical dependence. For example, if a first sequence of related events has a higher value of statistical dependence than a second sequence of related events, the first sequence of related events can be ranked higher than the second sequence of related events. The summary table 126 can include an indication of this ranking, such as by a number (e.g., 1, 2, 3, etc.) or other text, or can include the highest-ranked sequence of related events at a first, top row of the summary table 126 and lower-ranked sequences of related events in lower rows. Other examples are possible as well.

In some implementations, a user can select a row of the summary table 126, which can trigger the fault diagnostics computing device 106 to display supplemental information associated with the sequence of related events to which the selected row corresponds. For example, the fault diagnostics computing device 106 could be triggered to display the temporal precursor network 128 and highlight or otherwise emphasize the nodes in the temporal precursor network 128 that correspond to the selected sequence of related events. Additionally or alternatively, the fault diagnostics computing device 106 could be triggered to retrieve and display additional information about the aircraft subsystems and/or electrical buses involved in the sequence of related events, such as a visual indication (e.g., a diagram or map) of where the aircraft subsystems and/or electrical buses are within the aircraft 100 and/or other information. Other examples are possible as well.

The fault diagnostics computing device 106 can index and display other helpful information in the summary table 126 as well, such as a total number of flights of the aircraft 100 and of other aircrafts (i.e., other tail numbers) during which the sequence of related events occurred (e.g., "#of Flights," as shown in Table 4 and Table 5) and/or a total number of aircrafts (e.g., "#of Tails," as shown in Table 4 and Table 5) on which the sequence of related events occurred. Thus, the act of indexing can also involve updating the summary table 126 to include new columns that indicate those two total numbers, or to add those two total numbers to existing columns corresponding to the two types of total numbers. To facilitate this, the fault diagnostics computing device 106 can refer to reference data stored in the data storage 120 to determine the total number of flights of the aircraft and of other aircrafts during which the sequence of related events occurred and the total number of aircrafts on which the sequence of related events occurred and then update the summary table 126 to include those numbers. This and other information are shown by way of example in Table 4.

TABLE 4

| Event A | Event B | Event C | Statistical Dependence | # of Flights | # of Tails |
|---|---|---|---|---|---|
| 756 (Flight Control) | Electrical Bus 2 (−3 standard deviations) | None | 14.1 | 125 | 89 |
| Electrical Bus 7 (Environmental Control, Propulsion Control) | 3654 | 891 | 270 | 11 | 11 |

The fault diagnostics computing device 106 can also index and display in the summary table 126 a total number of flights of the aircraft 100 and of other aircrafts during which the sequence of related events occurred when an environmental condition (e.g., strong winds, ice, a thunderstorm) was present and/or a total number of aircrafts on which the sequence of related events occurred when the environmental condition was present. This information is shown by way of example in Table 5.

TABLE 5

| Event A | Event B | Event C | Statistical Dependence | # of Flights | # of Tails | # of Flights (Condition: strong winds) | # of Tails (Condition: strong winds) |
|---|---|---|---|---|---|---|---|
| 756 | Electrical Bus 2 | None | 14.1 | 125 | 89 | 1 | 1 |
| Electrical Bus 7 | 3654 | 891 | 270 | 11 | 11 | 11 | 11 |

In the manner discussed above and in other manners, the summary table 126 can be kept up-to-date and can indicate to users such as maintenance personnel or pilots a uniformity of the occurrence of the sequence of related events. In other words, if associated events are threshold-highly likely to be statistically dependent and are exhibited across many tail numbers and flights for each tail number, this might indicate to maintenance personnel, aircraft operators or other users that associated events might be inherent to the underlying hardware/software of the aircraft 100, not events that are tail-specific or environment specific. On the other hand, the associated events might be tail-specific or environment specific and not inherent to the design of the underlying hardware/software, in which case the number of distinct tail numbers on which the associated events occurred may be small.

Another important statistic for helping users assess the causal relationship between events is the period of time (or, "time lag") that elapses between any two consecutive events in a sequence of related events. This statistic advantageously characterizes the ability to predict the occurrence of the sequence of events.

To facilitate this, given two events of a sequence of events, the fault diagnostics computing device 106 can calculate, store in the summary table 126, and display in the summary table 126, an average (i.e., a mean) of periods of time between the first event and the second event over past occurrences of the sequence of related events. The fault diagnostics computing device 106 can also calculate, store in the summary table 126, and display in the summary table 126, a standard deviation of the periods of time between the first event and the second event over the past occurrences of the sequence of related events. A comparison between the mean and the standard deviation here can yield valuable insight as to the predictability of the two events.

Consider an example in which there is a sequence of three events, A, B, and C. The fault diagnostics computing device 106 can calculate (i) a mean, $\mu_1$, and standard deviation, of the time lags between the start times of events A and B over past occurrences of A and B, and (ii) a mean, $\mu_2$, and standard deviation, $\sigma_2$, of the time lags between the start times of events B and C over past occurrences of B and C. If a standard deviation for any given pair of events is, for instance, three times as large as the mean or larger, this indicates a large amount of deviation in the time lags between those events, and thus that the events are not inherent to the aircraft 100. On the other hand, if the standard deviation is much smaller (e.g., one-third the size of the mean), this may indicate much less deviation in the time lags between those events, and thus a predictability that one of the two events is likely to cause the other. However, in situations where both the mean and standard deviation are very small (e.g., 3 for the mean and 6 for the standard deviation), deviations from the mean might be less significant, rather being attributed to inherencies in the aircraft 100. Table 6 includes example means and standard deviations for two different sequences of three events.

TABLE 6

| Event A | Event B | Event C | Statistical Dependence | $\mu_1$ | $\sigma_1$ | $\mu_2$ | $\sigma_2$ |
|---|---|---|---|---|---|---|---|
| 7049 | 6521 | 1554 | 199.2 | 57.2 | 10.5 | 60 | 20 |
| Electrical Bus 3 | 1771 | 6480 | 275.8 | 3.13 | 6.01 | 28 | 218.6 |

In the preceding examples and other possible examples, event associations can be prioritized and leveraged for the purposes of diagnostics and fault resolution.

In some implementations, for instance, given a set of events, the fault diagnostics computing device 106 can perform additional calculations to obtain additional information detailing the likelihood of a causal relationship between the events. Consider for example a set of three events: A, B, and C, where A occurred in time before B, and B occurred in time before C. Given this set of events, there can be three primary causal possibilities: (i) A caused B and B caused C, (ii) A caused B and A caused C, and (iii) A caused B, B caused C, and A caused C. For each of these possibilities, the fault diagnostics computing device 106 can add the values of statistical dependence for the pairs and divide by the number of pairs to obtain an additional value of statistical dependence. For example, for the first possibility, the additional value of statistical dependence is equal to (M(A,B)+M(B,C))/2. For the second possibility, the additional value of statistical dependence is equal to (M(A,B)+M(A,C))/2. And for the third possibility, the additional value of statistical dependence is equal to (M(A,B)+M(A,C)+M(B,C))/3. The fault diagnostics computing device 106 then determines which of the three additional values of statistical dependence is highest and can store in the summary table 126 and/or display the highest of the three. The highest of the three values is attributed to the most likely causal possibility, which can provide even further help in identifying the root cause among the set of events. Other examples are possible as well, such as examples in which there are longer chains of events, such as four or more events.

Figure 3:
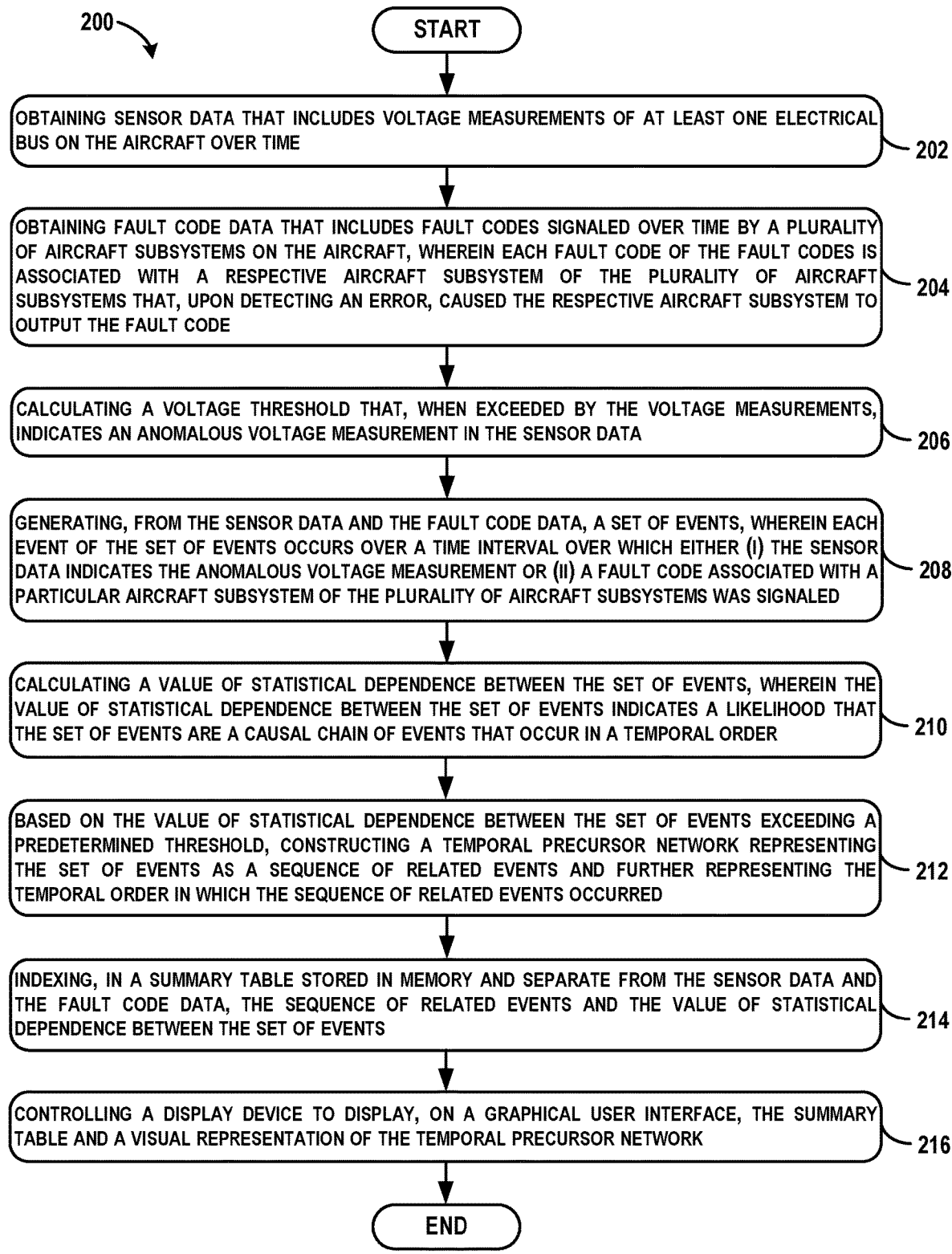
FIG. 3 shows a flowchart of an example method for identifying associated events in an aircraft, according to an example implementation.

FIG. 3 shows a flowchart of an example method 200 of identifying associated event in an aircraft, according to an example implementation. Method 200 shown in FIG. 3 presents an example of a method that could be used with the aircraft 100 shown in FIG. 1 or with components of the aircraft 100. Further, devices or systems, such as the system 102 or the fault diagnostics computing device 106, may be used or configured to perform logical functions presented in FIG. 3. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-216. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 3, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes obtaining sensor data that includes voltage measurements of at least one electrical bus on the aircraft over time.

At block 204, the method 200 includes obtaining fault code data that includes fault codes signaled over time by a plurality of aircraft subsystems on the aircraft, where each fault code of the fault codes is associated with a respective aircraft subsystem of the plurality of aircraft subsystems that, upon detecting an error, caused the respective aircraft subsystem to output the fault code.

At block 206, the method 200 includes calculating a voltage threshold that, when exceeded by the voltage measurements, indicates an anomalous voltage measurement in the sensor data.

Figure 4:
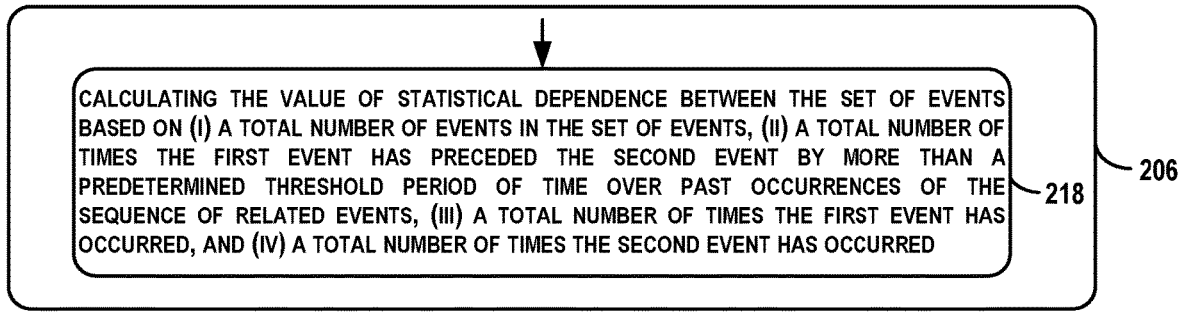
FIG. 4 shows a flowchart of an example method for performing the calculating function of the method of FIG. 3, according to an example implementation.

FIG. 4 shows a flowchart of an example method for performing the calculating as shown in block 206, according to an example implementation. In particular, the example method of FIG. 4 is for performing the calculating as shown in block 206 where the sequence of related events includes a first event and a second event. At block 218, functions include calculating the value of statistical dependence between the set of events based on (i) a total number of events in the set of events, (ii) a total number of times the first event has preceded the second event by more than a predetermined threshold period of time over past occurrences of the sequence of related events, (iii) a total number of times the first event has occurred, and (iv) a total number of times the second event has occurred.

Referring to FIG. 3, at block 208, the method 200 includes generating, from the sensor data and the fault code data, a set of events, where each event of the set of events occurs over a time interval over which either (i) the sensor data indicates the anomalous voltage measurement or (ii) a fault code associated with a particular aircraft subsystem of the plurality of aircraft subsystems was signaled.

Figure 5:
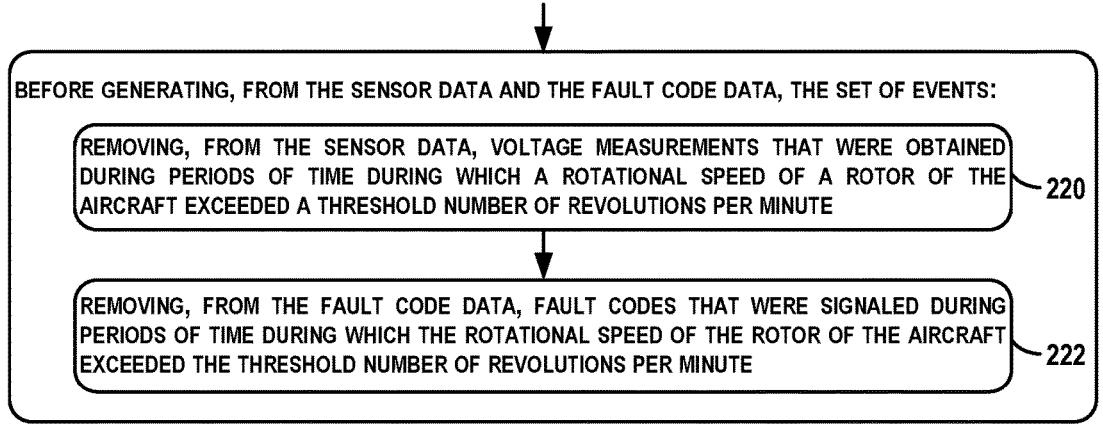
FIG. 5 shows a flowchart of an example method for use with the method of FIG. 3, according to an example implementation.

In some implementations, some functions may be performed before generating the set of events from the sensor data and the fault code data. FIG. 5 shows a flowchart of an example method for use with the method 200, according to an example implementation. Before generating, from the sensor data and the fault code data, the set of events, functions include removing, from the sensor data, voltage measurements that were obtained during periods of time during which a rotational speed of a rotor of the aircraft exceeded a threshold number of revolutions per minute, and removing, from the fault code data, fault codes that were signaled during periods of time during which the rotational speed of the rotor of the aircraft exceeded the threshold number of revolutions per minute, as shown in block 220 and block 222.

Referring to FIG. 3, at block 210, the method 200 includes calculating a value of statistical dependence between the set of events, where the value of statistical dependence between the set of events indicates a likelihood that the set of events are a causal chain of events that occur in a temporal order.

At block 212, the method 200 includes based on the value of statistical dependence between the set of events exceeding a predetermined threshold, constructing a temporal precursor network representing the set of events as a sequence of related events and further representing the temporal order in which the sequence of related events occurred.

At block 214, the method 200 includes indexing, in a summary table stored in memory and separate from the sensor data and the fault code data, the sequence of related events and the value of statistical dependence between the set of events.

Figure 6:
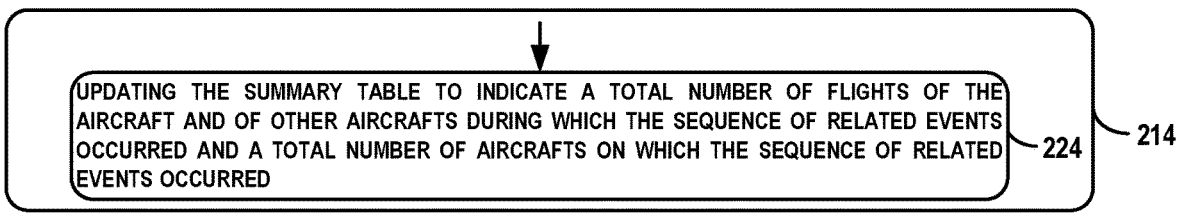
FIG. 6 shows a flowchart of an example method for performing the indexing function of the method of FIG. 3, according to an example implementation.

FIG. 6 shows a flowchart of an example method for performing the indexing as shown in block 214, according to an example implementation. At block 224, functions include updating the summary table to indicate a total number of flights of the aircraft and of other aircrafts during which the sequence of related events occurred and a total number of aircrafts on which the sequence of related events occurred.

Referring to FIG. 3, at block 216, the method 200 includes controlling a display device to display, on a graphical user interface, the summary table and a visual representation of the temporal precursor network.

Figure 7:
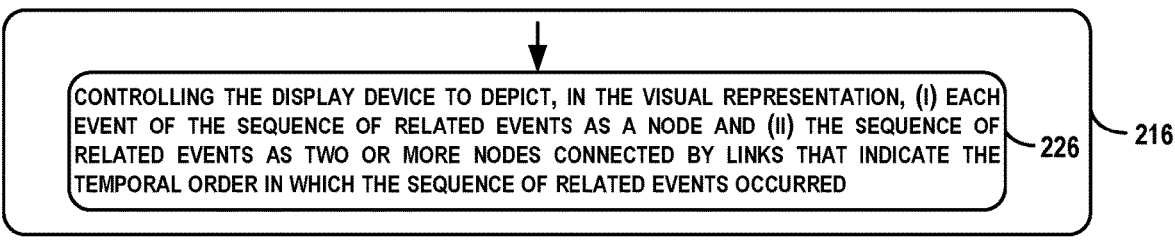
FIG. 7 shows a flowchart of an example method for performing the controlling function of the method of FIG. 3, according to an example implementation.

FIG. 7 shows a flowchart of an example method for performing the controlling as shown in block 216, according to an example implementation. At block 226, functions include controlling the display device to depict, in the visual representation, (i) each event of the sequence of related events as a node and (ii) the sequence of related events as two or more nodes connected by links that indicate the temporal order in which the sequence of related events occurred.

Figure 8:
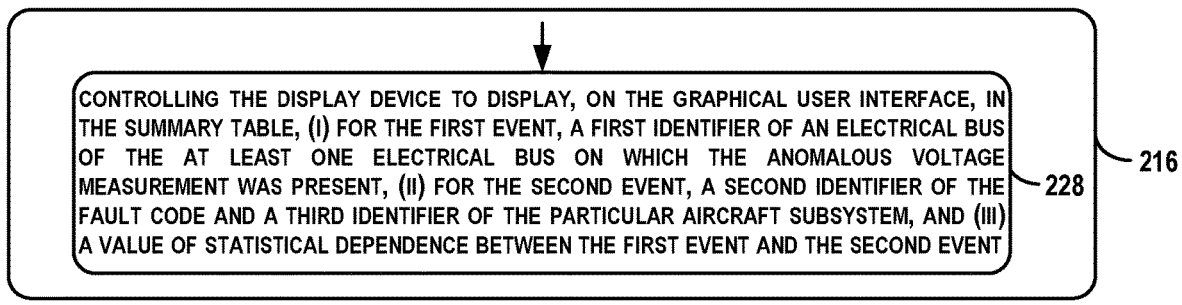
FIG. 8 shows a flowchart of another example method for performing the controlling function of the method of FIG. 3, according to an example implementation.

FIG. 8 shows a flowchart of another example method for performing the controlling as shown in block 216, according to an example implementation. In particular, the example method of FIG. 8 is for performing the controlling as shown in block 216 where the sequence of related events includes a first event in which the sensor data indicates the anomalous voltage measurement and a second event in which the fault code associated with the particular aircraft subsystem of the plurality of aircraft subsystems was signaled. At block 228, functions include controlling the display device to display, on the graphical user interface, in the summary table, (i) for the first event, a first identifier of an electrical bus of the at least one electrical bus on which the anomalous voltage measurement was present, (ii) for the second event, a second identifier of the fault code and a third identifier of the particular aircraft subsystem, and (iii) a value of statistical dependence between the first event and the second event.

Figure 9:
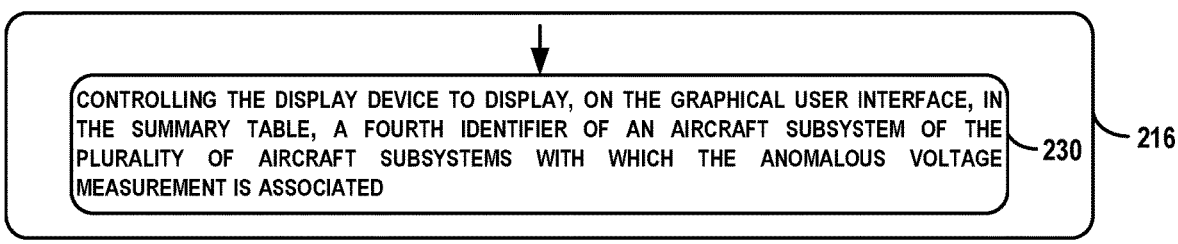
FIG. 9 shows a flowchart of another example method for performing the controlling function of the method of FIG. 3, according to an example implementation.

FIG. 9 shows a flowchart of another example method for performing the controlling as shown in block 216, according to an example implementation. At block 230, functions include controlling the display device to display, on the graphical user interface, in the summary table, a fourth identifier of an aircraft subsystem of the plurality of aircraft subsystems with which the anomalous voltage measurement is associated.

Figure 10:
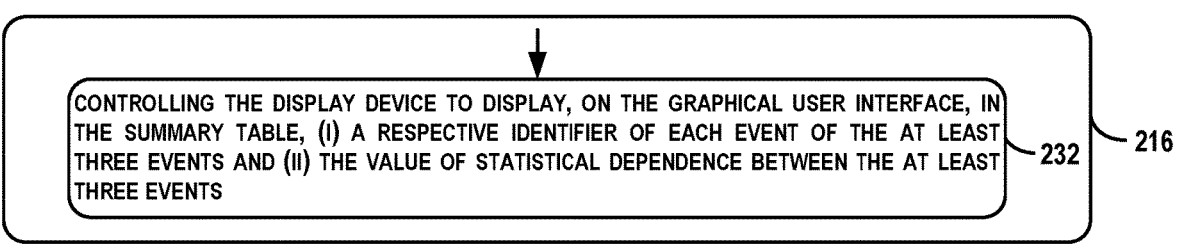
FIG. 10 shows a flowchart of another example method for performing the controlling function of the method of FIG. 3, according to an example implementation.

FIG. 10 shows a flowchart of another example method for performing the controlling as shown in block 216, according to an example implementation. In particular, the example method of FIG. 10 is for performing the controlling as shown in block 216 where the sequence of related events includes at least three events. At block 232, functions include controlling the display device to display, on the graphical user interface, in the summary table, (i) a respective identifier of each event of the at least three events and (ii) the value of statistical dependence between the at least three events.

Figure 11:
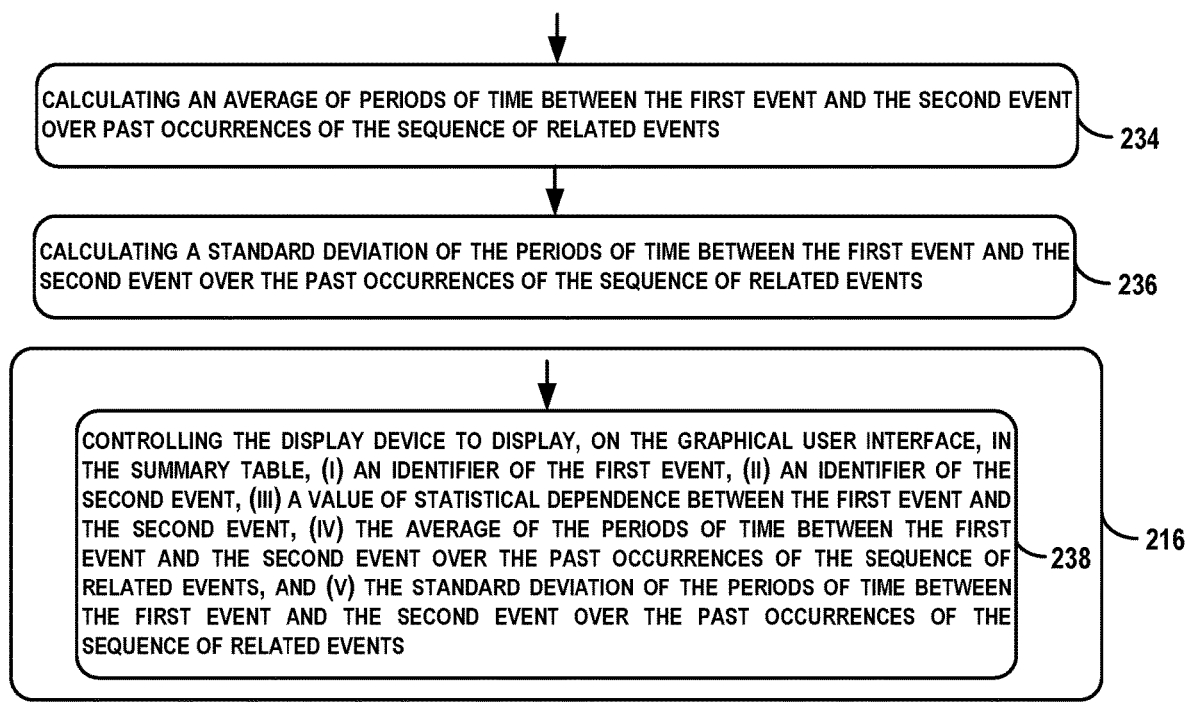
FIG. 11 shows a flowchart of another example method for use with the method of FIG. 3, and also shows a flowchart of another example method for performing the controlling function of the method of FIG. 3, according to an example implementation.

FIG. 11 shows a flowchart of another example method for use with the method 200, according to an example implementation. In particular, the example method of FIG. 11 is for use with the method 200 where the sequence of related events includes a first event and a second event. At block 234, functions include calculating an average of periods of time between the first event and the second event over past occurrences of the sequence of related events. And at block 236, functions include calculating a standard deviation of the periods of time between the first event and the second event over the past occurrences of the sequence of related events.

Further, FIG. 11 shows a flowchart of another example method for performing the controlling as shown in block 216, according to an example implementation. At block 238, functions include controlling the display device to display, on the graphical user interface, in the summary table, (i) an identifier of the first event, (ii) an identifier of the second event, (iii) a value of statistical dependence between the first event and the second event, (iv) the average of the periods of time between the first event and the second event over the past occurrences of the sequence of related events, and (v) the standard deviation of the periods of time between the first event and the second event over the past occurrences of the sequence of related events.

Figure 12:
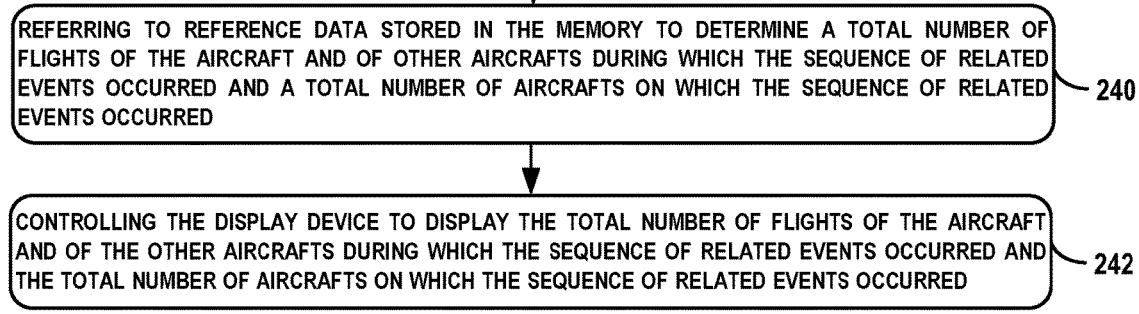
FIG. 12 shows a flowchart of another example method for use with the method of FIG. 3, according to an example implementation.

FIG. 12 shows a flowchart of another example method for use with the method 200, according to an example implementation. At block 240, functions include referring to reference data stored in the memory to determine a total number of flights of the aircraft and of other aircrafts during which the sequence of related events occurred and a total number of aircrafts on which the sequence of related events occurred. And at block 242, functions include controlling the display device to display the total number of flights of the aircraft and of the other aircrafts during which the sequence of related events occurred and the total number of aircrafts on which the sequence of related events occurred.

Figure 13:
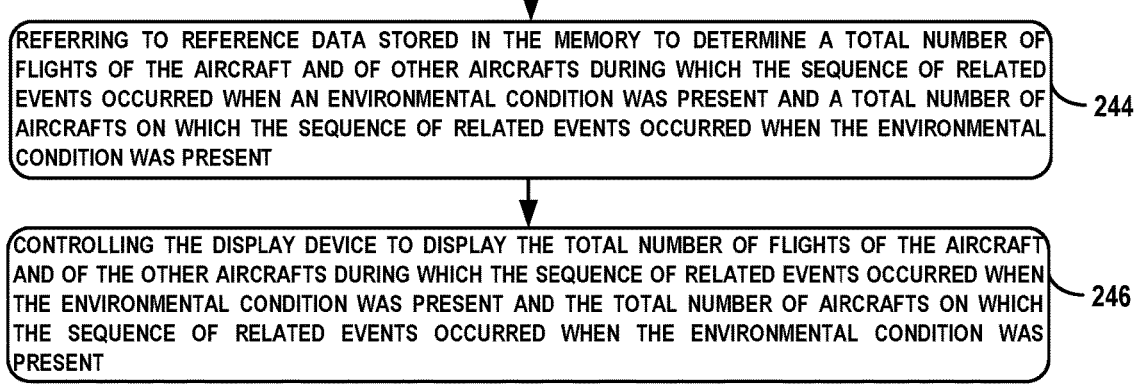
FIG. 13 shows a flowchart of another example method for use with the method of FIG. 3, according to an example implementation.

FIG. 13 shows a flowchart of another example method for use with the method 200, according to an example implementation. At block 244, functions include referring to reference data stored in the memory to determine a total number of flights of the aircraft and of other aircrafts during which the sequence of related events occurred when an environmental condition was present and a total number of aircrafts on which the sequence of related events occurred when the environmental condition was present. And at block 246, functions include controlling the display device to display the total number of flights of the aircraft and of the other aircrafts during which the sequence of related events occurred when the environmental condition was present and the total number of aircrafts on which the sequence of related events occurred when the environmental condition was present.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for identifying associated events in an aircraft, the method comprising:

obtaining sensor data that includes voltage measurements of at least one electrical bus on the aircraft over time;

obtaining fault code data that includes fault codes signaled over time by a plurality of aircraft subsystems on the aircraft, wherein each fault code of the fault codes is associated with a respective aircraft subsystem of the plurality of aircraft subsystems that, upon detecting an error, caused the respective aircraft subsystem to output the fault code;

calculating a voltage threshold that, when exceeded by the voltage measurements, indicates an anomalous voltage measurement in the sensor data;

generating, from the sensor data and the fault code data, a set of events, wherein each event of the set of events occurs over a time interval over which either (i) the sensor data indicates the anomalous voltage measurement or (ii) a fault code associated with a particular aircraft subsystem of the plurality of aircraft subsystems was signaled;

calculating a value of statistical dependence between the set of events, wherein the value of statistical dependence between the set of events indicates a likelihood that the set of events are a causal chain of events that occur in a temporal order;

based on the value of statistical dependence between the set of events exceeding a predetermined threshold, constructing a temporal precursor network representing the set of events as a sequence of related events and further representing the temporal order in which the sequence of related events occurred, wherein the sequence of related events includes a first event in which the sensor data indicates the anomalous voltage measurement and a second event in which the fault code associated with the particular aircraft subsystem of the plurality of aircraft subsystems was signaled;

indexing, in a summary table stored in memory and separate from the sensor data and the fault code data, the sequence of related events and the value of statistical dependence between the set of events; and controlling a display device to display, on a graphical user interface, the summary table and a visual representation of the temporal precursor network, wherein controlling the display device to display, on the graphical user interface, the summary table comprises controlling the display device to display, on the graphical user interface, in the summary table, (i) for the first event, a first identifier of an electrical bus of the at least one electrical bus on which the anomalous voltage measurement was present, (ii) for the second event, a second identifier of the fault code and a third identifier of the particular aircraft subsystem, and (iii) a value of statistical dependence between the first event and the second event.

2. The method of claim 1,
wherein calculating the value of statistical dependence between the set of events comprises calculating the value of statistical dependence between the set of events based on (i) a total number of events in the set of events, (ii) a total number of times the first event has preceded the second event by more than a predetermined threshold period of time over past occurrences of the sequence of related events, (iii) a total number of times the first event has occurred, and (iv) a total number of times the second event has occurred.

3. The method of claim 1, further comprising:
before generating, from the sensor data and the fault code data, the set of events:
removing, from the sensor data, voltage measurements that were obtained during periods of time during which a rotational speed of a rotor of the aircraft exceeded a threshold number of revolutions per minute; and
removing, from the fault code data, fault codes that were signaled during periods of time during which the rotational speed of the rotor of the aircraft exceeded the threshold number of revolutions per minute.

4. The method of claim 1, wherein indexing, in the summary table stored in the memory and separate from the sensor data and the fault code data, the sequence of related events and the value of statistical dependence between the set of events comprises updating the summary table to indicate a total number of flights of the aircraft and of other aircrafts during which the sequence of related events occurred and a total number of aircrafts on which the sequence of related events occurred.

5. The method of claim 1, wherein controlling the display device to display, on the graphical user interface, the summary table and the visual representation of the temporal precursor network comprises controlling the display device to depict, in the visual representation, (i) each event of the sequence of related events as a node and (ii) the sequence of related events as two or more nodes connected by links that indicate the temporal order in which the sequence of related events occurred.

6. The method of claim 1, wherein controlling the display device to display, on the graphical user interface, the summary table and the visual representation of the temporal precursor network comprises controlling the display device to display, on the graphical user interface, in the summary table, a fourth identifier of an aircraft subsystem of the plurality of aircraft subsystems with which the anomalous voltage measurement is associated.

7. The method of claim 1, wherein the sequence of related events includes at least three events, and
wherein controlling the display device to display, on the graphical user interface, the summary table and the visual representation of the temporal precursor network comprises controlling the display device to display, on the graphical user interface, in the summary table, (i) a respective identifier of each event of the at least three events and (ii) the value of statistical dependence between the at least three events.

8. The method of claim 1, further comprising:
calculating an average of periods of time between the first event and the second event over past occurrences of the sequence of related events; and
calculating a standard deviation of the periods of time between the first event and the second event over the past occurrences of the sequence of related events,
wherein controlling the display device to display, on the graphical user interface, the summary table and the visual representation of the temporal precursor network comprises controlling the display device to display, on the graphical user interface, in the summary table, (i) an identifier of the first event, (ii) an identifier of the second event, (iii) the value of statistical dependence between the first event and the second event, (iv) the average of the periods of time between the first event and the second event over the past occurrences of the sequence of related events, and (v) the standard deviation of the periods of time between the first event and the second event over the past occurrences of the sequence of related events.

9. The method of claim 1, further comprising:
referring to reference data stored in the memory to determine a total number of flights of the aircraft and of other aircrafts during which the sequence of related events occurred and a total number of aircrafts on which the sequence of related events occurred; and
controlling the display device to display the total number of flights of the aircraft and of the other aircrafts during which the sequence of related events occurred and the total number of aircrafts on which the sequence of related events occurred.

10. The method of claim 1, further comprising:
referring to reference data stored in the memory to determine a total number of flights of the aircraft and of other aircrafts during which the sequence of related events occurred when an environmental condition was present and a total number of aircrafts on which the sequence of related events occurred when the environmental condition was present; and
controlling the display device to display the total number of flights of the aircraft and of the other aircrafts during which the sequence of related events occurred when the environmental condition was present and the total number of aircrafts on which the sequence of related events occurred when the environmental condition was present.

11. A non-transitory computer readable medium having stored thereon instructions, that when executed by one or more processors of a computing device, cause the computing device to perform operations comprising:
obtaining sensor data that includes voltage measurements of at least one electrical bus on an aircraft over time;
obtaining fault code data that includes fault codes signaled over time by a plurality of aircraft subsystems on the aircraft, wherein each fault code of the fault codes is associated with a respective aircraft subsystem of the plurality of aircraft subsystems that, upon detecting an error, caused the respective aircraft subsystem to output the fault code;
calculating a voltage threshold that, when exceeded by the voltage measurements, indicates an anomalous voltage measurement in the sensor data;
generating, from the sensor data and the fault code data, a set of events, wherein each event of the set of events occurs over a time interval over which either (i) the sensor data indicates the anomalous voltage measurement or (ii) a fault code associated with a particular aircraft subsystem of the plurality of aircraft subsystems was signaled;
calculating a value of statistical dependence between the set of events, wherein the value of statistical dependence between the set of events indicates a likelihood that the set of events are a causal chain of events that occur in a temporal order;

based on the value of statistical dependence between the set of events exceeding a predetermined threshold, constructing a temporal precursor network representing the set of events as a sequence of related events and further representing the temporal order in which the sequence of related events occurred, wherein the sequence of related events includes a first event in which the sensor data indicates the anomalous voltage measurement and a second event in which the fault code associated with the particular aircraft subsystem of the plurality of aircraft subsystems was signaled;

indexing, in a summary table stored in memory and separate from the sensor data and the fault code data, the sequence of related events and the value of statistical dependence between the set of events; and controlling a display device to display, on a graphical user interface, the summary table and a visual representation of the temporal precursor network, wherein controlling the display device to display, on the graphical user interface, the summary table comprises controlling the display device to display, on the graphical user interface, in the summary table, (i) for the first event, a first identifier of an electrical bus of the at least one electrical bus on which the anomalous voltage measurement was present, (ii) for the second event, a second identifier of the fault code and a third identifier of the particular aircraft subsystem, and (iii) a value of statistical dependence between the first event and the second event.

12. The non-transitory computer readable medium of claim 11, wherein the operations further comprise:

before generating, from the sensor data and the fault code data, the set of events:

removing, from the sensor data, voltage measurements that were obtained during periods of time during which a rotational speed of a rotor of the aircraft exceeded a threshold number of revolutions per minute; and removing, from the fault code data, fault codes that were signaled during periods of time during which the rotational speed of the rotor of the aircraft exceeded the threshold number of revolutions per minute.

13. The non-transitory computer readable medium of claim 11, wherein calculating the value of statistical dependence between the set of events comprises calculating the value of statistical dependence between the set of events based on (i) a total number of events in the set of events, (ii) a total number of times the first event has preceded the second event by more than a predetermined threshold period of time over past occurrences of the sequence of related events, (iii) a total number of times the first event has occurred, and (iv) a total number of times the second event has occurred.

14. The non-transitory computer readable medium of claim 11, wherein indexing, in the summary table stored in the memory and separate from the sensor data and the fault code data, the sequence of related events and the value of statistical dependence between the set of events comprises updating the summary table to indicate a total number of flights of the aircraft and of other aircrafts during which the sequence of related events occurred and a total number of aircrafts on which the sequence of related events occurred.

15. The non-transitory computer readable medium of claim 11, wherein controlling the display device to display, on the graphical user interface, the summary table and the visual representation of the temporal precursor network comprises controlling the display device to depict, in the visual representation, (i) each event of the sequence of related events as a node and (ii) the sequence of related events as two or more nodes connected by links that indicate the temporal order in which the sequence of related events occurred.

16. A system comprising:

a plurality of aircraft subsystems on an aircraft; and a fault diagnostics computing device having a processor and memory storing instructions executable by the processor to perform operations comprising:

obtaining sensor data that includes voltage measurements of at least one electrical bus on the aircraft over time;

obtaining fault code data that includes fault codes signaled over time by the plurality of aircraft subsystems, wherein each fault code of the fault codes is associated with a respective aircraft subsystem of the plurality of aircraft subsystems that, upon detecting an error, caused the respective aircraft subsystem to output the fault code;

calculating a voltage threshold that, when exceeded by the voltage measurements, indicates an anomalous voltage measurement in the sensor data;

generating, from the sensor data and the fault code data, a set of events, wherein each event of the set of events occurs over a time interval over which either (i) the sensor data indicates the anomalous voltage measurement or (ii) a fault code associated with a particular aircraft subsystem of the plurality of aircraft subsystems was signaled;

calculating a value of statistical dependence between the set of events, wherein the value of statistical dependence between the set of events indicates a likelihood that the set of events are a causal chain of events that occur in a temporal order;

based on the value of statistical dependence between the set of events exceeding a predetermined threshold, constructing a temporal precursor network representing the set of events as a sequence of related events and further representing the temporal order in which the sequence of related events occurred, wherein the sequence of related events includes a first event in which the sensor data indicates the anomalous voltage measurement and a second event in which the fault code associated with the particular aircraft subsystem of the plurality of aircraft subsystems was signaled;

indexing, in a summary table stored in the memory and separate from the sensor data and the fault code data, the sequence of related events and the value of statistical dependence between the set of events; and controlling a display device to display, on a graphical user interface, the summary table and a visual representation of the temporal precursor network, wherein controlling the display device to display, on the graphical user interface, the summary table comprises controlling the display device to display, on the graphical user interface, in the summary table, (i) for the first event, a first identifier of an electrical bus of the at least one electrical bus on which the anomalous voltage measurement was present, (ii for the second event, a second identifier of the fault code and a third identifier of the particular aircraft subsystem, and (iii) a value of statistical dependence between the first event and the second event.

17. The system of claim 16, wherein the operations further comprise:
calculating an average of periods of time between the first event and the second event over past occurrences of the sequence of related events; and
calculating a standard deviation of the periods of time between the first event and the second event over the past occurrences of the sequence of related events,
wherein controlling the display device to display, on the graphical user interface, the summary table and the visual representation of the temporal precursor network comprises controlling the display device to display, on the graphical user interface, in the summary table, (i) an identifier of the first event, (ii) an identifier of the second event, (iii) the value of statistical dependence between the first event and the second event, (iv) the average of the periods of time between the first event and the second event over the past occurrences of the sequence of related events, and (v) the standard deviation of the periods of time between the first event and the second event over the past occurrences of the sequence of related events.

18. The system of claim 16, wherein the operations further comprise:
referring to reference data stored in the memory to determine a total number of flights of the aircraft and of other aircrafts during which the sequence of related events occurred and a total number of aircrafts on which the sequence of related events occurred; and
controlling the display device to display the total number of flights of the aircraft and of the other aircrafts during which the sequence of related events occurred and the total number of aircrafts on which the sequence of related events occurred.

19. The system of claim 16, wherein the operations further comprise:
referring to reference data stored in the memory to determine a total number of flights of the aircraft and of other aircrafts during which the sequence of related events occurred when an environmental condition was present and a total number of aircrafts on which the sequence of related events occurred when the environmental condition was present; and
controlling the display device to display the total number of flights of the aircraft and of the other aircrafts during which the sequence of related events occurred when the environmental condition was present and the total number of aircrafts on which the sequence of related events occurred when the environmental condition was present.

20. The non-transitory computer readable medium of claim 11, wherein the sequence of related events includes at least three events, and
wherein controlling the display device to display, on the graphical user interface, the summary table and the visual representation of the temporal precursor network comprises controlling the display device to display, on the graphical user interface, in the summary table, (i) a respective identifier of each event of the at least three events and (ii) the value of statistical dependence between the at least three events.

* * * * *